United States Patent
Suyama

(10) Patent No.: US 11,453,120 B2
(45) Date of Patent: Sep. 27, 2022

(54) ROBOT SYSTEM

(71) Applicant: FANUC CORPORATION, Yamanashi (JP)

(72) Inventor: Keita Suyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 107 days.

(21) Appl. No.: 16/986,965

(22) Filed: Aug. 6, 2020

(65) Prior Publication Data

US 2021/0053211 A1    Feb. 25, 2021

(30) Foreign Application Priority Data

Aug. 20, 2019   (JP) .............. JP2019-150290

(51) Int. Cl.
  *B25J 9/12*   (2006.01)
  *B25J 9/16*   (2006.01)
(52) U.S. Cl.
  CPC ............. *B25J 9/126* (2013.01); *B25J 9/1602* (2013.01); *B25J 9/1633* (2013.01)
(58) Field of Classification Search
  CPC ..... B25J 9/0096; B25J 9/10; B25J 9/12; B25J 9/126; B25J 9/1602; B25J 9/1633; G05B 19/19
  See application file for complete search history.

(56) References Cited

U.S. PATENT DOCUMENTS

| | | | |
|---|---|---|---|
| 2011/0140330 A1 | 6/2011 | Nishikawa et al. | |
| 2013/0345866 A1 | 12/2013 | Tanaka et al. | |
| 2016/0008983 A1* | 1/2016 | Osaka | B25J 9/1628 700/254 |
| 2018/0147724 A1 | 5/2018 | Oaki | |
| 2018/0361592 A1 | 12/2018 | Motoyoshi | |

FOREIGN PATENT DOCUMENTS

| | | |
|---|---|---|
| EP | 2255933 A1 | 12/2010 |
| EP | 2660014 A1 | 11/2013 |
| JP | 2011134050 A | 7/2011 |
| JP | 2012139754 A | 7/2012 |
| JP | 2015047672 A | 3/2015 |
| JP | 2018083274 A | 5/2018 |
| JP | 2019000948 A | 1/2019 |
| WO | 2009113364 A1 | 9/2009 |

* cited by examiner

*Primary Examiner* — Dale Moyer
(74) *Attorney, Agent, or Firm* — Karceski IP Law, PLLC

(57) ABSTRACT

A robot system includes: a robot including drive shafts; and a control device configured to control the robot, in which each of the drive shafts includes a drive unit configured to cause a second member to operate with respect to a first member, the drive unit includes a motor, a deceleration mechanism configured to decelerate rotation of the motor and supply the rotation to the first member and the second member, and an input-side detector configured to detect a rotation angle position of the motor, at least one drive unit includes an output-side detector configured to detect an operation position of the second member with respect to the first member, and the control device controls the motor such that each of the drive shafts with high responsiveness is caused to operate with priority, on the basis of the detected rotation angle position of the motor and the detected operation position.

9 Claims, 6 Drawing Sheets

ROBOT SYSTEM

CROSS-REFERENCE TO RELATED APPLICATIONS

This application claims the benefit of and relies for priority on Japanese Patent Application No. 2019-150290, filed on Aug. 20, 2019, the entire content of which is incorporated herein by reference.

FIELD OF THE INVENTION

The present disclosure relates to a robot system.

BACKGROUND OF THE INVENTION

At a joint portion of a robot, rotation of a motor is decelerated using a deceleration mechanism to drive an output shaft. In a case in which an encoder attached to the motor is used to detect a rotation angle to control the position of the output shaft, positional deviation may occur due to backlash and twisting at the deceleration mechanism or the like, and it may not be possible to improve positioning precision.

It has been known in such a case to dispose another position detection sensor on the side of the output shaft to improve positioning precision of the output shaft (see Japanese Unexamined Patent Application, Publication No. 2019-948, for example).

SUMMARY OF THE INVENTION

According to an aspect of the present disclosure, there is provided a robot system including: a robot including a plurality of drive shafts; and a control device configured to control the robot, in which each of the drive shafts includes a drive unit configured to cause a second member to operate with respect to a first member, the drive unit includes a motor, a deceleration mechanism configured to decelerate rotation of the motor and supply the rotation to the first member and the second member, and an input-side detector configured to detect a rotation angle position of the motor, at least one drive unit includes an output-side detector configured to detect an operation position of the second member with respect to the first member, and the control device controls the motor such that each of the drive shafts with high responsiveness is caused to operate with priority, on the basis of the rotation angle position of the motor detected by the input-side detector and the operation position detected by the output-side detector.

DESCRIPTION OF EMBODIMENT(S) OF THE INVENTION

A robot system 1 according to an embodiment of the present disclosure will be described below with reference to drawings.

Figure 1:
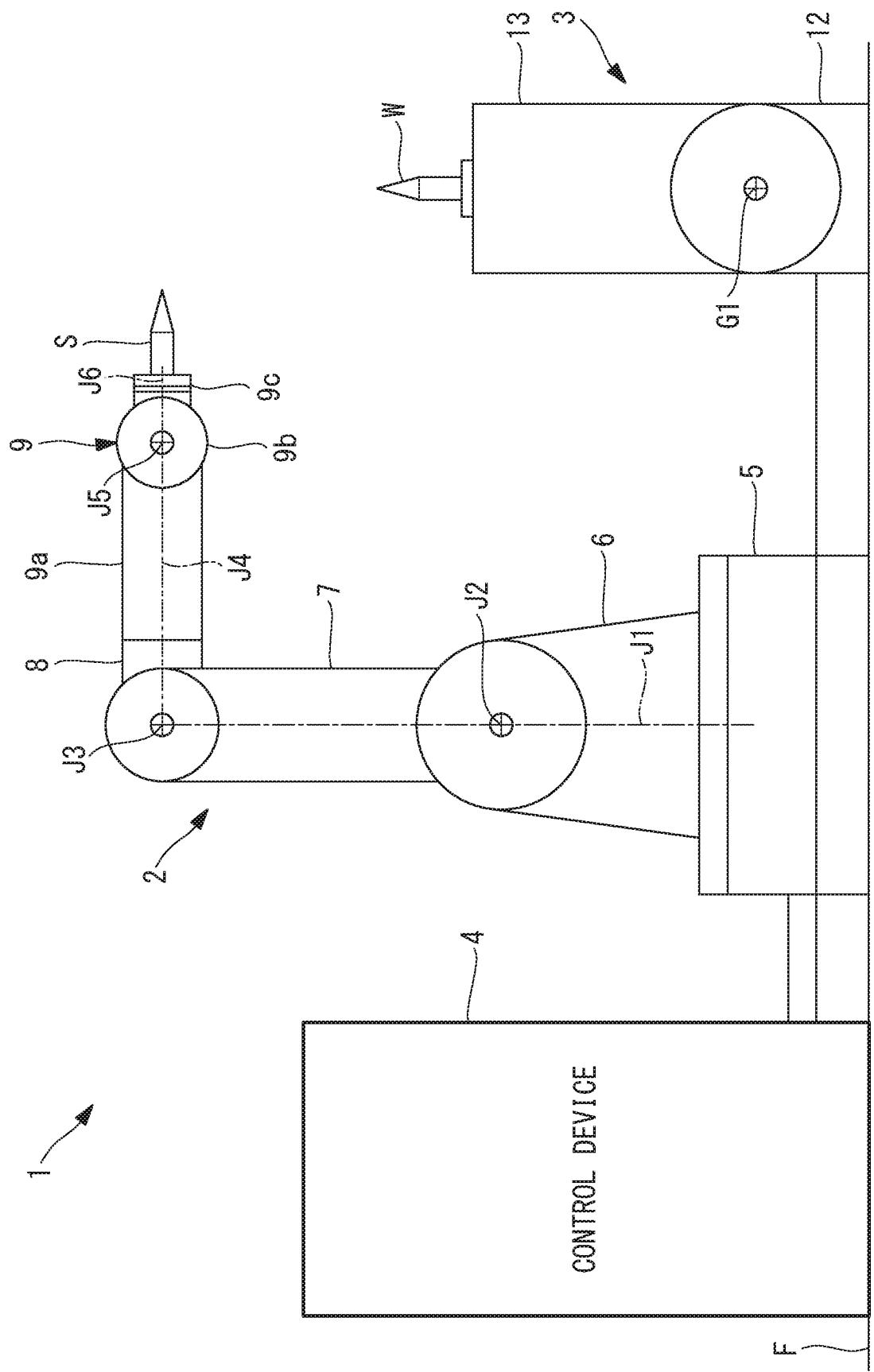
FIG. 1 is an overall configuration diagram illustrating a robot system according to an embodiment of the present disclosure.

The robot system 1 according to the embodiment includes a 6-shaft articulated type robot 2 including six drive shafts 10, a positioner (external device) 3 capable of changing the position and the posture of a mounted workpiece W, and a control device 4 configured to control the robot 2 and the positioner 3, as illustrated in FIG. 1, for example.

The robot 2 includes a base 5 that is placed on a floor surface F and a pivoting body 6 supported by the base 5 so as to be able to rotate about a vertical first axial line J1. Also, the robot 2 includes a first arm 7 supported by the pivoting body 6 so as to be able to rotate about a horizontal second axial line J2 and a second arm 8 supported by the first arm 7 so as to be rotate about a third axial line J3 that is parallel to the second axial line J2. Further, the robot 2 includes a three-shaft wrist unit 9 supported at a distal end of the second arm 8.

The wrist unit 9 includes a first wrist element 9a supported by the second arm 8 so as to be able to rotate about a fourth axial line J4 that perpendicularly intersects the third axial line J3, a second wrist element 9b supported by the first wrist element 9a so as to be able to rotate about a fifth axial line J5 that is parallel to the third axial line J3 and perpendicularly intersects the fourth axial line J4, and a third wrist element 9c supported by the second wrist element 9b so as to be able to rotate about a sixth axial line J6 that perpendicularly intersects the fifth axial line J5.

In the embodiment, the six drive shafts 10 are a mechanism configured to drive rotation of the pivoting body 6 about the first axial line J1 with respect to the base 5, a mechanism configured to drive rotation of the first arm 7 about the second axial line J2 with respect to the pivoting body 6, a mechanism configured to drive rotation of the second arm 8 about the third axial line J3 with respect to the first arm 7, a mechanism configured to drive rotation of the first wrist element 9a about the fourth axial line J4 with respect to the second arm 8, a mechanism configured to drive rotation of the second wrist element 9b about the fifth axial line J5 with respect to the first wrist element 9a, and a mechanism configured to drive rotation of the third wrist element 9c about the sixth axial line J6 with respect to the second wrist element 9b.

A tool S is secure to a distal end of the wrist unit 9.

In the embodiment, a needle-shaped member for indicating a positioning target position is used as the workpiece W, and a needle-shaped member for indicating a tool distal end point is used as a tool S, for simplifying the description.

Figure 2:
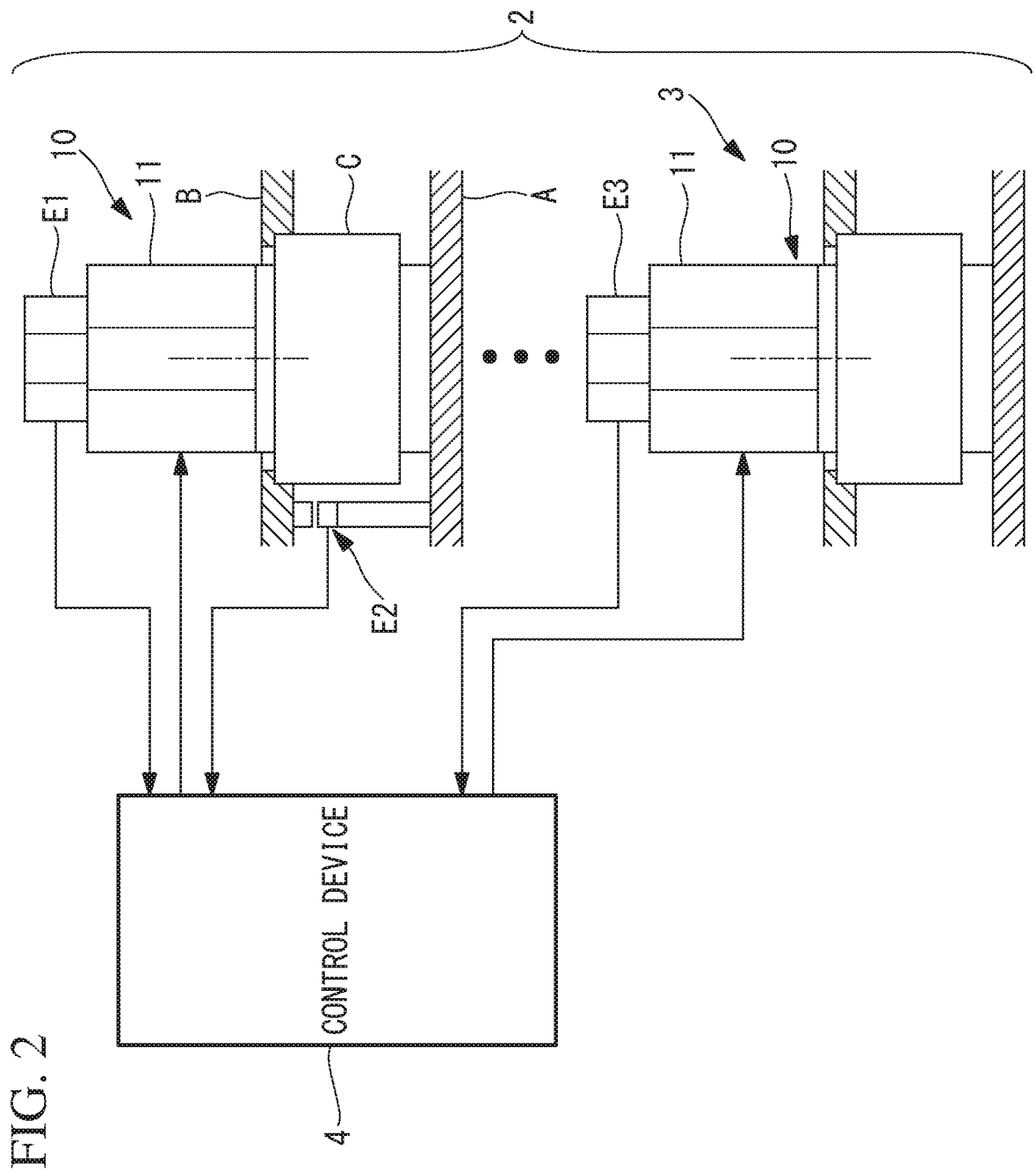
FIG. 2 is a diagram for explaining connection of a robot main body and drive shafts of a positioner to a control device in the robot system in FIG. 1.

Each of the drive shafts 10 includes a drive unit configured to cause a second member B to operate with respect to a first member A as illustrated in FIG. 2. The drive unit includes a motor 11 to be driven and a deceleration mechanism C configured to decelerate rotation of the motor 11 and transmit the rotation to the second member B. Here, the second member B with respect to the first member A corresponds to the pivoting body 6 with respect to the base 5, the first arm 7 with respect to the pivoting body 6, and the second arm 8 with respect to the first arm 7.

Also, the drive unit includes a first encoder (input-side detector) E1 capable of detecting the rotation angle position of the motor 11. Further, the drive unit includes a second encoder (output-side detector) E2 configured to detect a rotation angle position (working position) of the second member B with respect to the first member A at each drive shaft 10.

The positioner 3 includes a base 12 and a placement platform 13, which is driven to rotate about a horizontal axial line G1 with respect to the base 12, to which the workpiece W is attached, as illustrated in FIG. 1. The positioner 3 is also provided with a motor 11 configured to cause the placement platform 13 to swing with respect to the base 12 and an encoder (input-side detector) E3 configured to detect the rotation angle position of the motor 11.

As illustrated in FIG. 2, the rotation angle position of the motor 11 of each drive shaft 10 of the robot 2 detected by the first encoder E1 of the drive unit and the rotation angle position (working position) of the second member B with respect to the first member A detected by the second encoder E2 are input to the control device 4. Also, the rotation angle position of the motor 11 detected by the encoder E3 of the positioner 3 is input to the control device 4.

The control device 4 calculates an operation command signal for the motor 11 of each drive shaft 10 on the basis of the input rotation angle position of the motor 11 of each drive shaft 10 of the robot 2, the rotation angle position of the second member B with respect to the first member A, and the rotation angle position of the motor 11 of the positioner 3 and outputs the operation command signal to the motor 11.

In a case in which the motor 11 is controlled on the basis only of the rotation angle position of the motor 11 detected by the first encoder E1 of each drive shaft 10, it is not possible to position the tool distal end of the robot 2 at a positioning target position with high precision due to influences such as backlash of the deceleration mechanism C.

Figure 3:
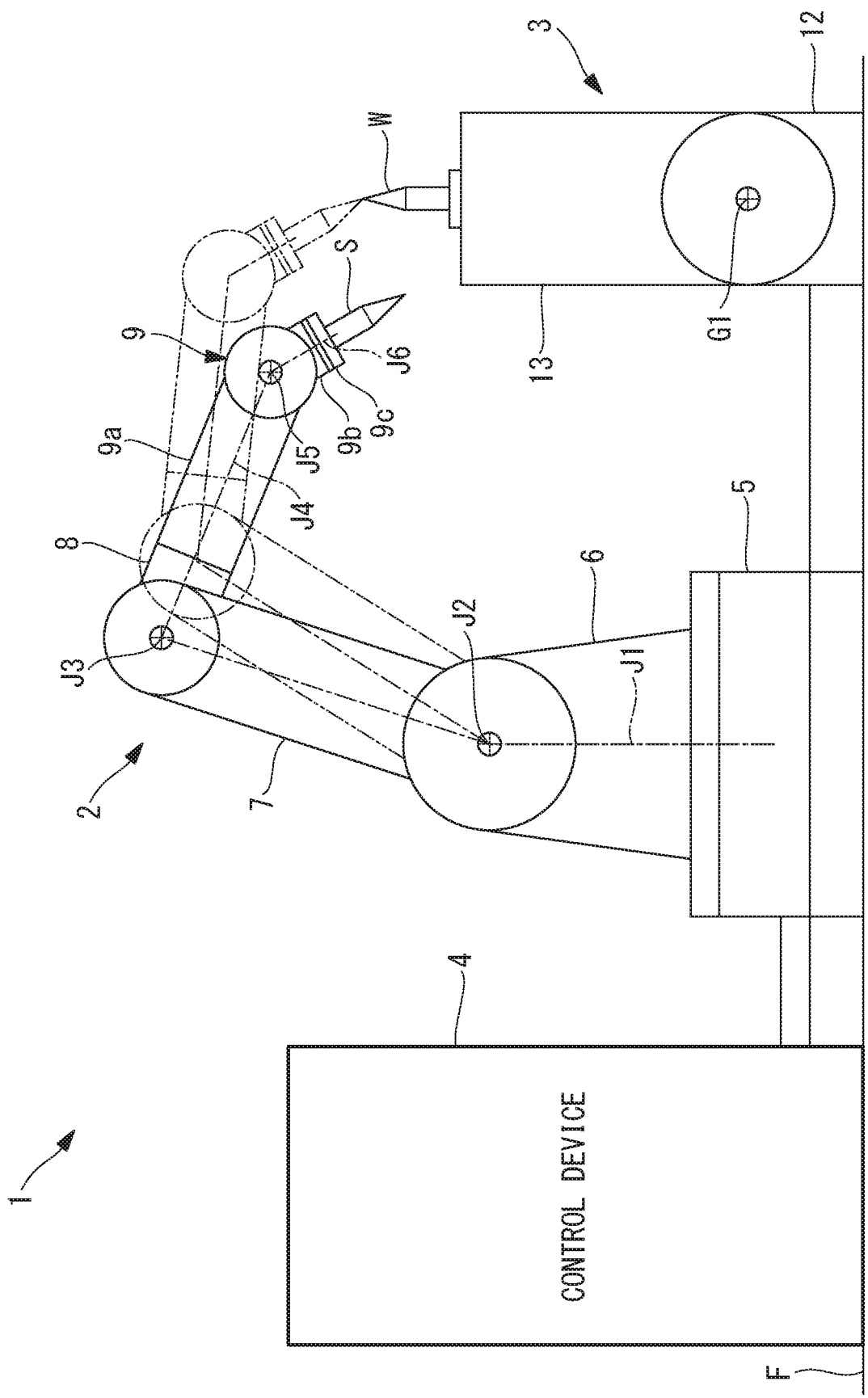
FIG. 3 is an overall configuration diagram for explaining an ideal case in which only the robot main body is caused to operate to precisely reach a positioning target position in the robot system in FIG. 1.

As illustrated in FIG. 3 in an emphasized manner, for example, the chain line represents the robot 2 in a state in which the robot 2 is positioned at the positioning target position while the solid line represents the robot 2 in a state in which the robot 2 deviates from the positioning target position.

In this case, since the rotation angle position of the motor 11 detected by the first encoder E1 has reached the target rotation angle position, no more correcting operation will not be performed, and the deviation remains between the positioning target position and the current position.

On the other hand, the rotation angle position of the second member B with respect to the first member A detected by the second encoder E2 represents directly the current position of each drive shaft 10 of the robot 2.

Therefore, the control device 4 controls the motor 11 of each drive shaft 10 to set the deviation between the target rotation angle position of each drive shaft 10 and the rotation angle position of the second member B with respect to the first member A detected by the second encoder E2 to zero.

In this case, a control gain of the motor 11 in the control device 4 differs for each drive shaft 10, and some drive shafts 10 have large control gains while other drive shafts 10 have small control gains.

For example, rigidity of the drive shaft 10 of the positioner 3 is higher than rigidity of each drive shaft 10 of the robot 2, and the positioner 3 has a larger control gain for controlling the motor 11 in the embodiment.

Since the drive shaft 10 with a larger control gain can operate with steeper acceleration and deceleration, it is possible to extend a time during which a high-speed operation is performed and thereby to reduce a time to reach the target position.

Thus, the control device 4 performs such control that the drive shafts 10 of the robot 2 and the drive shaft 10 of the positioner 3 are caused to operate with higher priority in a descending order from the larger control gains.

In other words, the control device 4 performs control the drive shafts 10 of both the robot 2 and the positioner 3 in the descending order from larger responsiveness, that is, from the larger control gains without controlling only the robot 2 to cause the robot 2 to reach the target position, as illustrated by the chain line in FIG. 3. In this manner, the control device 4 dispose the robot 2 and the positioner 3 at positions at which the tool distal end point can conform to the positioning target position of the workpiece W, as illustrated by the chain line in FIG. 5.

Figure 4:
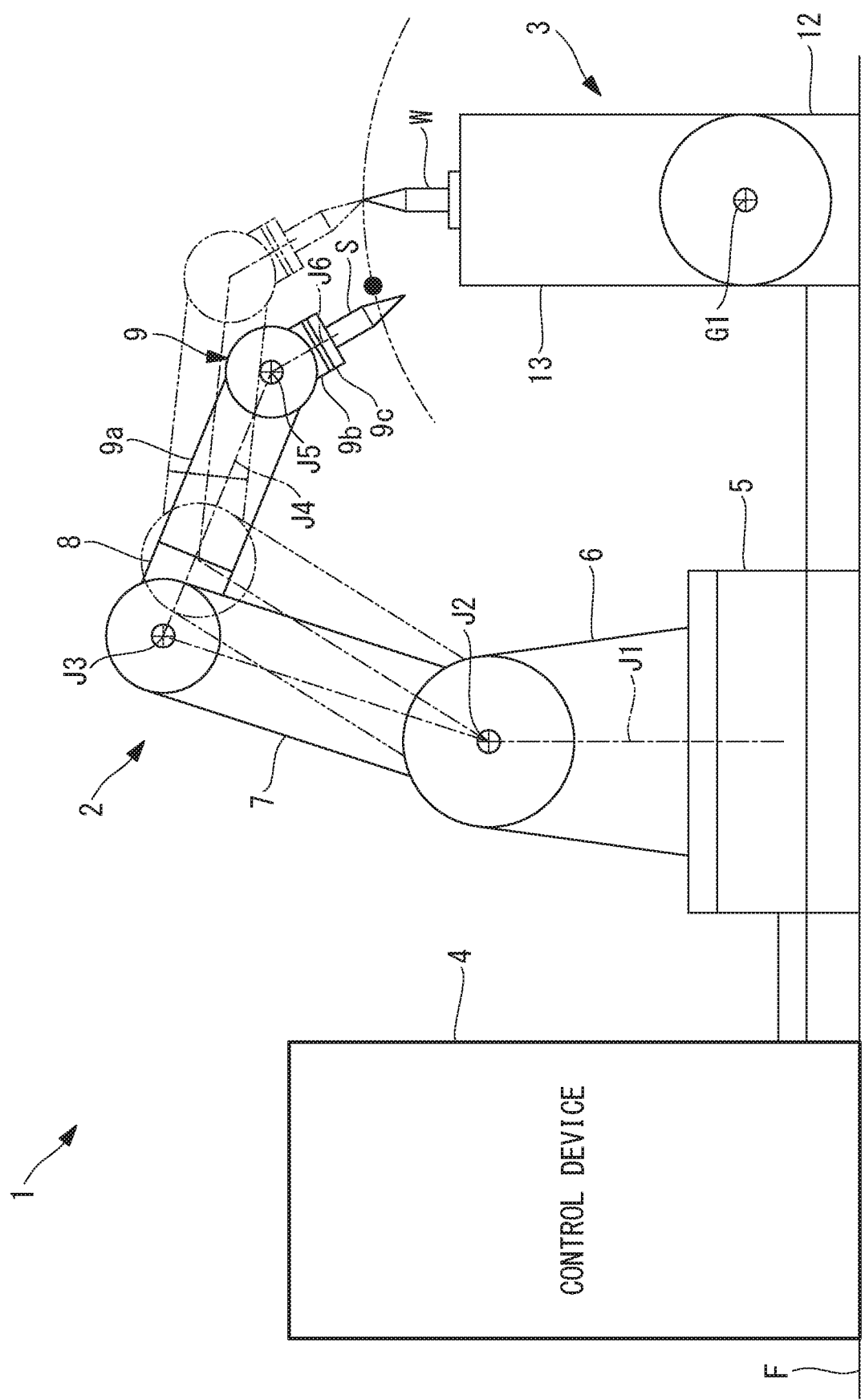
FIG. 4 is an overall configuration diagram for explaining a new operation target position set in the robot system in FIG. 1.

More specifically, the control device 4 sets a new operation target position on an operation locus of the positioning target position performed by the positioner 3 as illustrated in FIG. 4.

Figure 5:
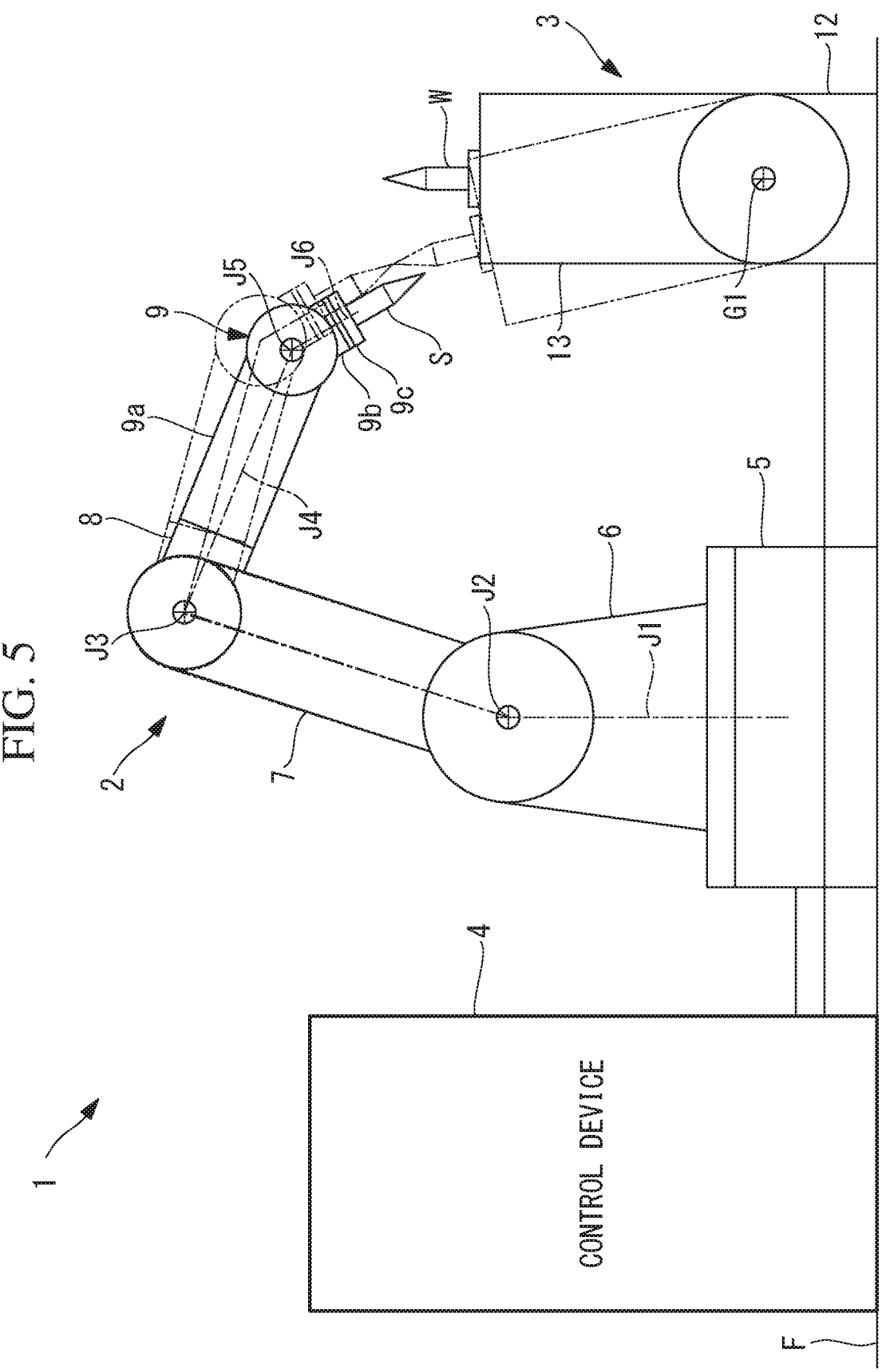
FIG. 5 is an overall configuration diagram for explaining a case in which the robot main body and the positioner are caused to operate toward the new operation target position set in FIG. 4 in the robot system in FIG. 1.

The new operation target position is determined on the basis of responsiveness of each drive shaft 10, that is, how larger control gains are. For example, the positioner 3 with high rigidity operates for a longer time than the drive shafts 10 of the robot 2 with low rigidity to cause the workpiece W to reach the operation target position. Then, the control device 4 causes the workpiece W and the tool S to approach one another by causing the robot 2 and the positioner 3 to operate toward the new operation target position as illustrated in FIG. 5.

In this manner, according to the robot system 1 in the embodiment, the drive shaft 10 with high responsiveness is caused to operate with high priority in the operation of correcting a positional deviation due to backlash or the like of the deceleration mechanism C of the robot 2 in a case in which the positioner 3 including the one or more drive shafts 10 is used along with the robot 2 including the sixth drive shafts 10. Thus, there is an advantage that it is possible to perform quick and precise positioning.

Although in a case in which the number of patterns of disposition of the tool S with respect to the workpiece W is one, the posture of the robot 2 is uniquely determined in accordance with the rotation angle position of the drive shaft 10 of the positioner 3, there are multiple methods in which the tool distal end point reaches the positioning target position of the workpiece w. Therefore, it is only necessary for the control device 4 to set the new operation target position at a position at which the drive shaft 10 of the positioner 3 is caused to operate for as long as possible.

Figure 6:
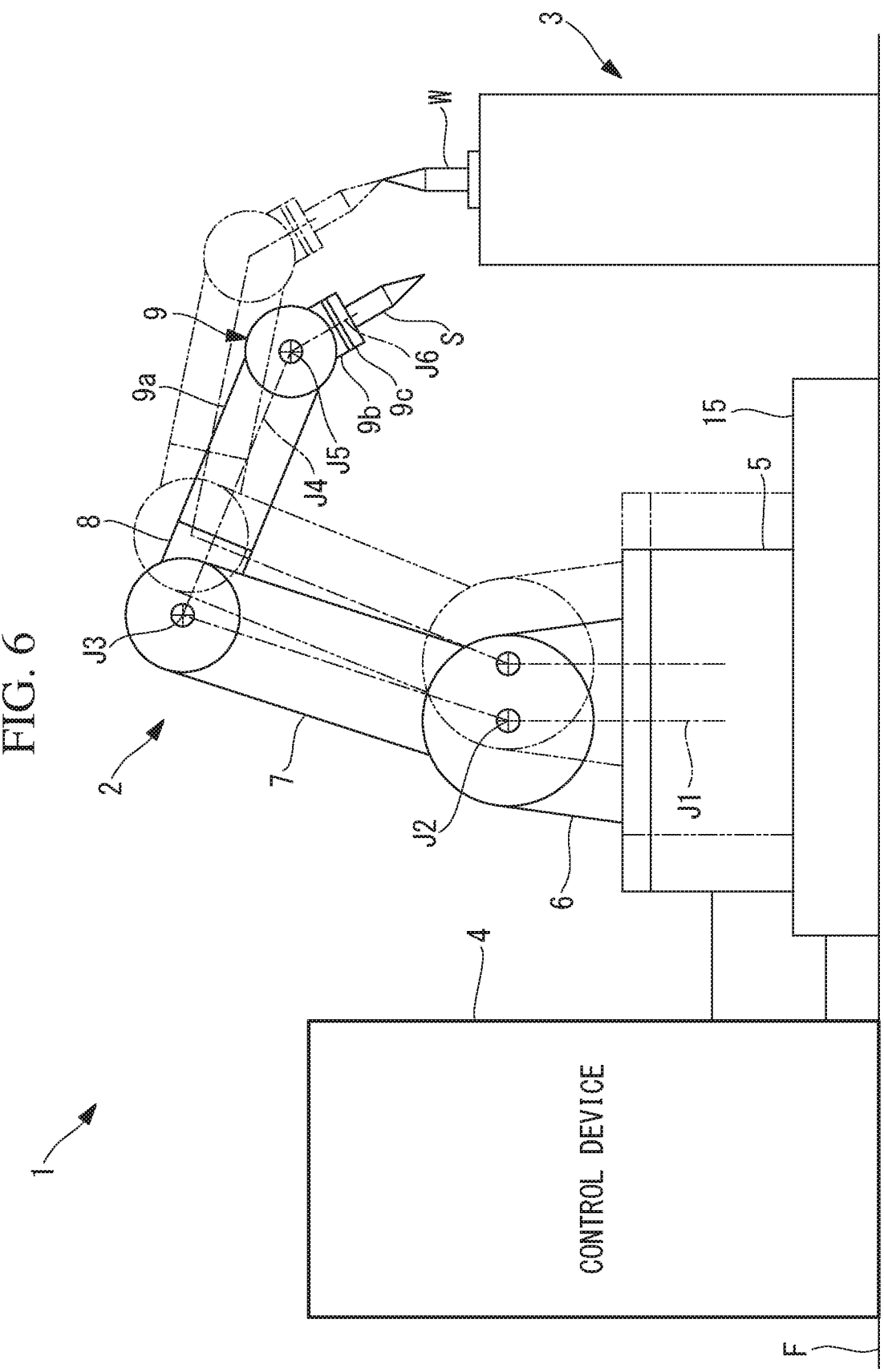
FIG. 6 is an overall configuration diagram illustrating a modified example of the robot system in FIG. 1.

Also, although the robot system 1 including the six-shaft articulated type robot 2 and the one-shaft positioner 3 has been exemplified in the embodiment, the present disclosure is not limited thereto. For example, a traveling device 15 adapted such that the entire robot 2 is caused to move as illustrated in FIG. 6 or a traveling carriage that is not illustrated may be employed instead of the one-shaft positioner 3 as an external device. In this case, the positioner 3 that does not include any drive shaft 10 may be employed as the positioner 3 on which the workpiece W is mounted.

Also, although each drive shaft 10 with high responsiveness is caused to operate with priority in the embodiment, it is only necessary to cause each drive shaft 10 to operate such that the time to complete the positioning is minimized in accordance with the amount of correction of the position and the shaft speed of each drive shaft 10.

Also, the six-shaft articulated type robot has been exemplified as a robot, the form of the robot is not limited thereto. It is possible to employ an arbitrary robot such as a horizontal articulated type robot, a cylindrical coordinate system robot, or a direct-driven-type robot.

In addition, although the six-shaft robot has been exemplified as a robot, a robot with an arbitrary number of drive shafts (for example, seven or more shafts) may be employed. Also, an external device with an arbitrary number of drive shafts may be employed. Instead of the robot system including the robot with six or more shafts and the external device with an arbitrary number of drive shafts, a robot system including a robot with seven or more shafts may be employed. It is only necessary for the control device to cause each drive shaft with high responsiveness to operate with priority similarly to the above description.

Also, although the second encoders are disposed between the base and the pivoting body, between the pivoting body and the first arm, and the first arm and the second arm in the embodiment, the second encoder may not be provided at a drive shaft that is unlikely to cause problems such as backlash. In addition, the second encoder may be disposed for at least one of the three drive shafts of the wrist unit. Also, the second encoder may be disposed at the positioner.

The invention claimed is:

1. A robot system, comprising:
   a robot including a plurality of drive shafts; and
   a control connected to the robot to control the robot,
   wherein each of the drive shafts includes a drive to operate a second member with respect to a first member,
   wherein the drive includes a motor,
   wherein the drive includes a gear to decelerate rotation of the motor and supply the rotation to the first member and the second member,
   wherein the drive includes a first encoder to detect a rotation angle position of the motor,
   wherein at least one drive includes a second encoder to detect an operation position of the second member with respect to the first member, and
   wherein the control controls the motor such that each of the drive shafts with high responsiveness is caused to operate with priority, on the basis of the rotation angle position of the motor detected by the first encoder and the operation position detected by the second encoder,
   wherein the responsiveness is determined by control gains of the plurality of drive shafts.

2. The robot system according to claim 1, wherein the control controls the motor of the drive to set deviations between an operation target position of the second member with respect to the first member and the operation position detected by the second encoder to zero.

3. A robot system, comprising:
   a robot including at least one first drive shaft;
   an external device including at least one second drive shaft; and
   a control connected to the robot to control the robot and the external device,
   wherein each of the first drive shafts includes a drive to operate a second member with respect to a first member,
   wherein the drive includes a motor,
   wherein the drive includes a gear to decelerate rotation of the motor and supply the rotation to the first member and the second member,
   wherein the drive includes a first encoder to detect a rotation angle position of the motor,
   wherein the drive includes a second encoder to detect an operation position of the second member with respect to the first member, and
   the control controls the motor such that each of the drive shafts with high responsiveness is caused to operate with priority, on the basis of the rotation angle position of the motor detected by the first encoder and the operation position detected by the second encoder.

4. The robot system according to claim 3, wherein the responsiveness is determined by control gains of the first and second drive shafts.

5. The robot system according to claim 4, wherein the control controls the motor of the drive to set deviations between an operation target position of the second member with respect to the first member and the operation position detected by the second encoder to zero.

6. The robot system according to claim 3, wherein the control controls the motor of the drive to set deviations between an operation target position of the second member with respect to the first member and the operation position detected by the second encoder to zero.

7. The robot system according to claim 3, wherein the control sets a new operation target position at which each of the drive shafts with high responsiveness is caused to operate with priority while keeping a necessary relative positional relationship between the robot and an operation target at an operation target position of each of the drive shafts and controls the motor of the drive to set a deviation between the new operation target position and the operation position to zero.

8. The robot system according to claim 7, wherein the external device is a positioner to position a workpiece at a working position of the robot.

9. The robot system according to claim 7, wherein the external device is a carriage to move the robot mounted thereon.

* * * * *